United States Patent Office 3,605,515
Patented Sept. 20, 1971

3,605,515
VARIABLE-RATIO POSITIVE-DRIVE TRANSMISSION
Robert Eugène Jules Lecavelier, Paris, and Jean Tubeuf, Ville-d'Avray, France, assignors to Societe Anonyme dite: Societe d'Etude de la Propulsion par Reaction, Puteaux, France
Filed July 29, 1969, Ser. No. 845,708
Claims priority, application France, July 31, 1968, 161,415
Int. Cl. F16h 3/00, 35/02, 55/04
U.S. Cl. 74—393     3 Claims

ABSTRACT OF THE DISCLOSURE

A variable speed positive-drive power transmission includes a power group of gears and at least two coupling groups, both of which are coupled to the power groups. The power groups each include a primary input shaft and at least two oscillatory shafts. The oscillatory shafts operate with periodic speed variations and therefore have variable reduction ratios in relation to the primary shaft of the group. Each coupling group has a secondary shaft and each secondary shaft is coupled to motion transfer points of the power groups. The transmission is intended for use with lathes and other machine tools where variable oscillatory speeds are required.

BACKGROUND OF THE INVENTION

(1) Field of the invention

This invention relates to a variable-ratio positive-drive transmission between an input shaft and at least one output shaft.

(2) Description of the prior art

It is sometimes necessary to impart to an output shaft, from a continuously running input shaft, rotary motion conforming to a given law.

A number of ways of achieving this have been proposed. Thus, one of the first improvements proposed was the provision of means whereby a drive could be applied at given instants to synchronising rollers. Then efforts were directed at replacing the friction rollers by positive-drive mechanisms. In these mechanisms it was proposed to apply to the rollers at the desired instant by a shaft rotating at variable speed, the connection between the shafts to be coupled being established at the instant when coincidence of speed and position had been achieved between the shafts in question.

Change-speed gear box combinations were thus devised by joining a number of stages in series, each of the stages being capable of providing for transmission at two different ratios.

However, the problem of synchronising these various stages remains unchanged as soon as it is sought to make more complex combinations, because it is then necessary to synchronise speeds in such a way that the changes of ratio in the various stages occur simultaneously.

It was possible, so long as change-speed boxes could be designed by using only two stages in series, to drive the shafts running at variables speeds from the shaft common to those two stages and hence to achieve strictly synchronous operation of the two stages, as is necessary when, to change gear, the ratio in the second stage is considerably increased and the ratio in the first stage is reduced accordingly.

This reduces the number of change-speed box combinations that can be readily designed to four or seven speeds.

The object of the present invention is to provide a transmission such that synchronisation of the various stages can be achieved.

SUMMARY OF THE INVENTION

According to the present invention there is provided in a variable-ratio positive-drive transmission means defining a power output, means defining a power group comprising a primary input shaft, at least two oscillating shafts each having variable reduction ratios in relation to the primary shaft, said variation in ratio being continuous and periodic between limits, and means defining at least two motion transfer points, means defining at least two coupling groups, each said coupling group being connected to said motion transfer points and to the oscillatory shafts and comprising a secondary shaft, and means for coupling the secondary shaft to each of the motion transfer points and each of the oscillatory shafts.

The desire to produce such a transmission has led to the development of an oscillatory speed device comprising several oscillatory-speed shafts, centralised and capable of driving at the same time all the output shafts of which it is desired to vary the speed. An oscillatory-speed shaft as the term is used herein, is a shaft rotatable at variable speed and capable of driving a secondary shaft through a coupling so as to bring this, without relative slip, from an initial speed to a final speed at which this secondary shaft can be uncoupled from the oscillatory shaft and coupled to a power-drive shaft. This implies the use of at least two oscillatory shafts, the motions of which are periodic and the speeds of which are governed by complementary laws, so as to permit the acceleration of certain shafts and simultaneously the deceleration of other shafts. For this reason, it is necessary to provide means for selecting the oscillatory shaft to be used for bringing about the speed change, according to the direction of that change and to the instant at which it is to be carried out, it being possible for the said change to be carried out over one half-revolution of the driving shaft or over a certain number of revolutions of the said driving shaft, according to the design of the oscillatory device.

BRIEF DESCRIPTION OF THE DRAWINGS

Two embodiments of transmissions in accordance with the invention will now be described, by way of example, with reference to the accompanying diagrammatic drawings, in which.

Figure 1:
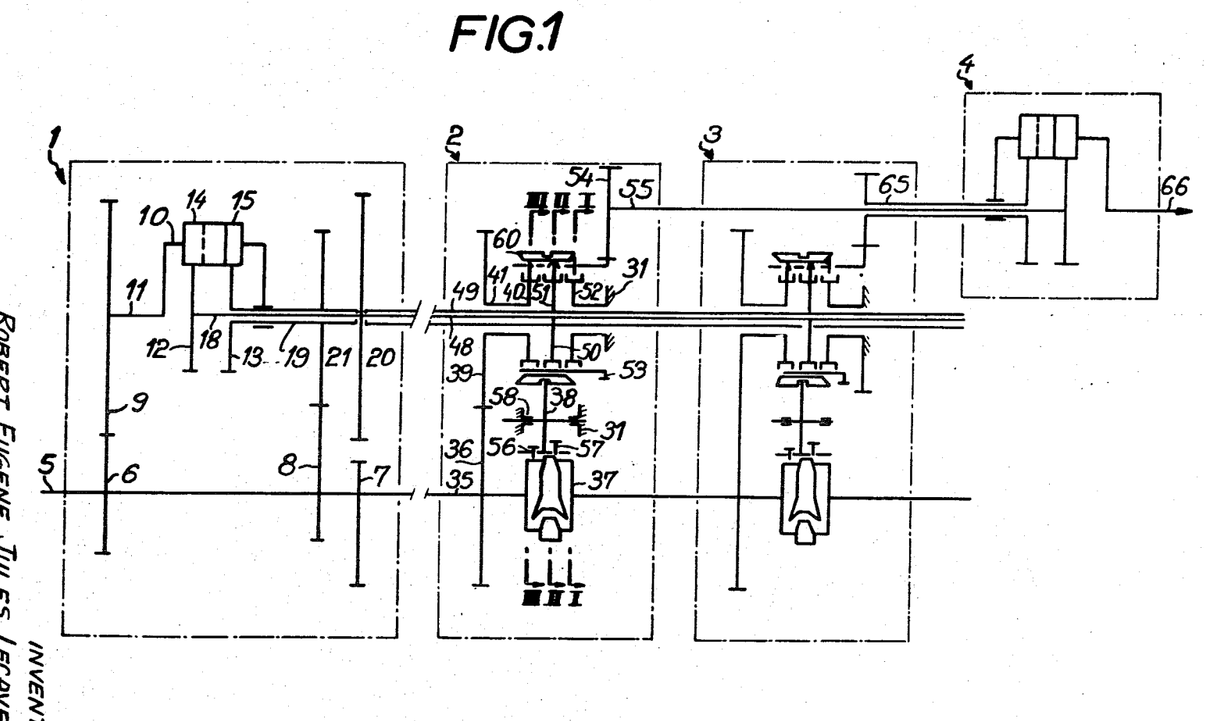
FIG. 1 is a diagrammatic view of a positive-drive transmission in accordance with the invention, the transmission being arranged for change in speed during one half-revolution of the input shaft.
Figure 9:
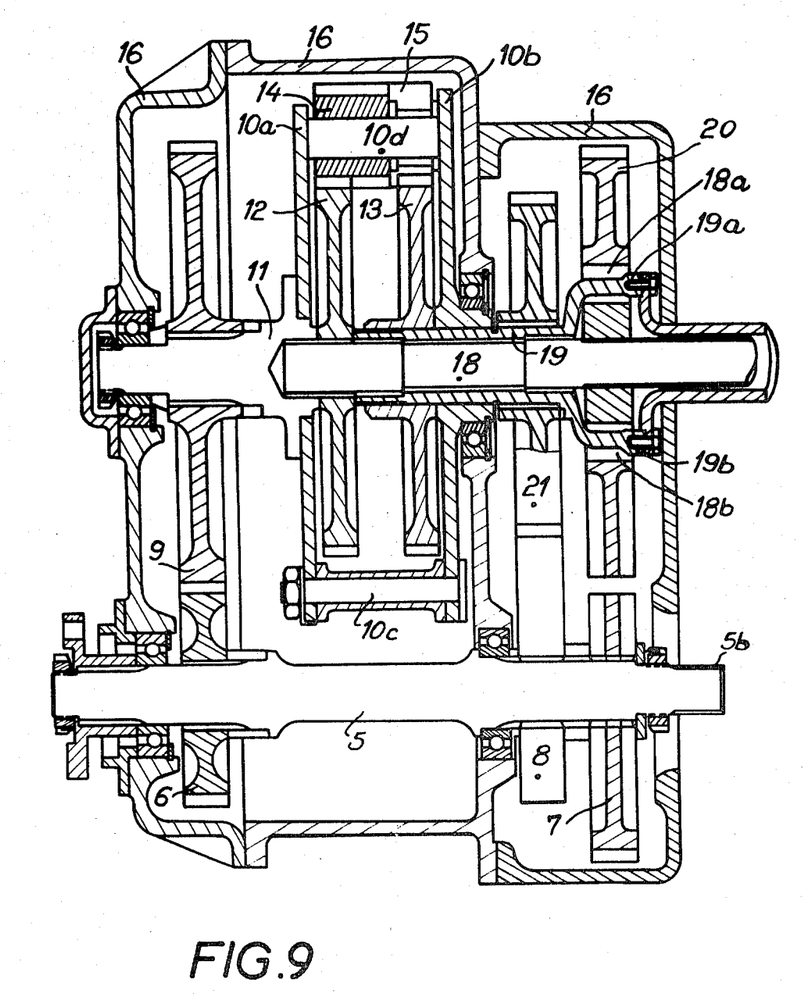
FIG. 9 is a sectional view of a power group of the transmission.

Referring now to the drawings, a positive-drive transmission such as shown in FIGS. 1 and 9 comprises a power group 1, two couplings groups 2 and 3, a shaft-power combining mechanism 4, an input shaft 5, and a tertiary output shaft 66.

The term "pinion" will be applied herein to a conventional pinion rotating about its central axis and the term "oscillatory pinion" to a specially shaped pinion, toothed around the whole or part of its periphery and capable of rotation about an off-center axis.

Keyed to an input or primary shaft 5, within the casing 16 of the power group 1, are a pinion 6, and two oscillatory pinions 7 and 8. The pinion 6 is in mesh with a gear wheel 9, which drives a planet-wheel carrier 10, rotating about a spindle 11. The carrier 10 comprises two cheeks, 10a and 10b, rigidly connected together by crossties 10c, and planet-wheel spindles 10d (FIG. 9). The two motion transfer points are the casing 16, that is to say that one of the power shafts has zero speed, and the primary shaft 5, which constitutes the second power shaft.

The planet-wheel carrier 10 rides on pinions of equal diameter 12 and 13, through two sets of planet pinions 14 and 15. The pinions 14 rotate about spindles 10d (FIG. 9) on the planet carrier 10, while the pinions 15 rotate about spindles (not shown) identical to 10d. While, moreover, in addition to the fact that the pinions 14 mesh with the pinions 12 and the pinions 15 with the pinions 13, the pinions 14 and 15 are also in mesh with each other. The pinions 12 and 13 are mounted on coaxial oscillatory shafts 18 and 19. The oscillatory pinion 7 acts in conjunction with an oscillatory pinion 20, on the oscillatory shaft 18. The oscillatory pinion 8, which is identical to 7 but mounted at 180° out-of-phase to it, acts in conjunction with an oscillatory pinion 21 identical to pinion 20 and keyed to the shaft 19. The latter is extended through the pinion 20 by means of the arms 19a and 19b, which pass through openings, 18a and 18b, in the pinion 20.

Since coupling groups 2 and 3 are identical, only one of them will now be described.

The coupling groups 2 (FIGS. 1 and 10) comprises a shaft, 35, coupled by a homo-kinetic transmission 5b (shown diagrammatically in FIG. 9) and 35a, to the input shaft 5, to which shaft 35 is keyed a pinion 36, and a cam 37. Two coaxial oscillatory shafts 48 and 49, are coupled homo-kinetically to the shafts 18 and 19, oscillatory shafts 48 and 49 being equipped with dog clutch gear teeth 50 and 51. The pinion 36 is in mesh with the pinion 39, which rotates on a spindle 41 (FIG. 10), equipped with dog clutch teeth 40, the spindle 41 being likewise coaxial with the shafts 48 and 49. The casing 31 of the coupling group is provided with a dog-clutch having teeth 52.

These dog clutch members 40, 50, 51 and 52 can be made to act in conjunction with dog clutch type engagement members carried by a pinion 53, rotating on a spindle coaxial with the shafts 48 and 49 and engaging with a pinion, 54, carried by a shaft 55, which constitutes the secondary output shaft of the coupling group 2. This shaft 55 also acts in conjunction with a shaft 65, in the coupling group 3, thus providing the two inputs to the combining mechanism 4, the output from which is the tertiary shaft 66.

Figure 10:
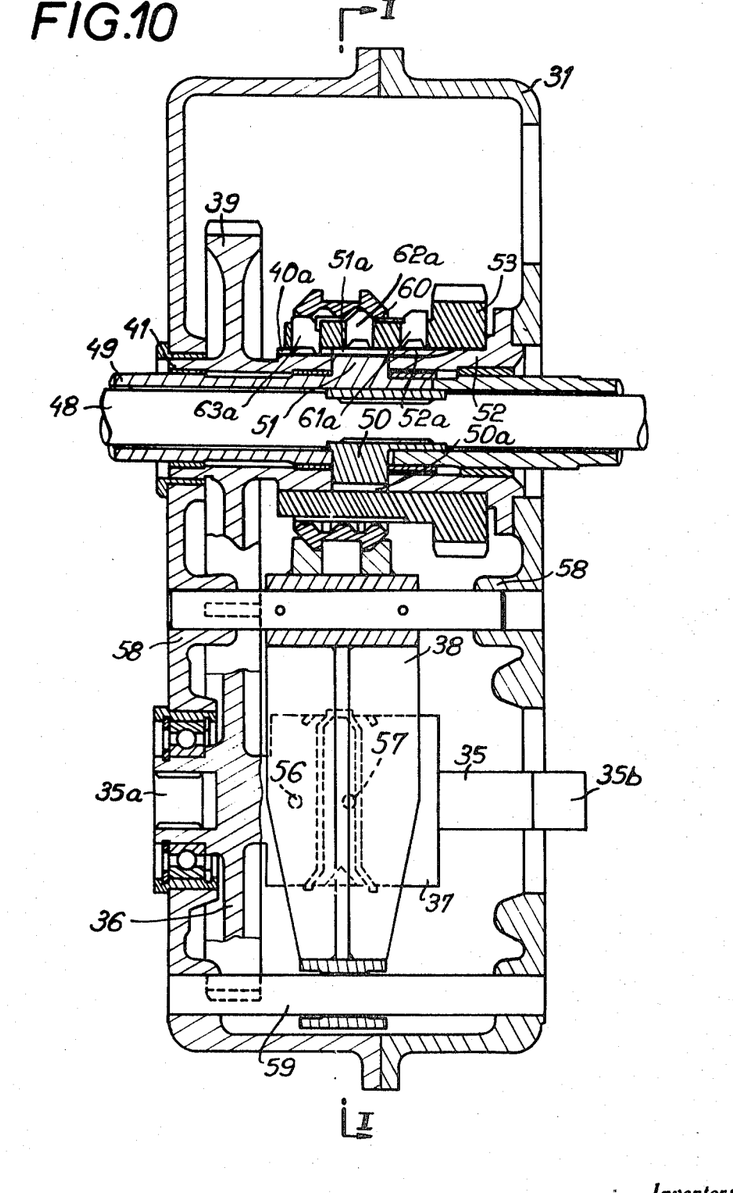
FIG. 10 is a sectional view of a coupling group of the transmission.
Figure 11:
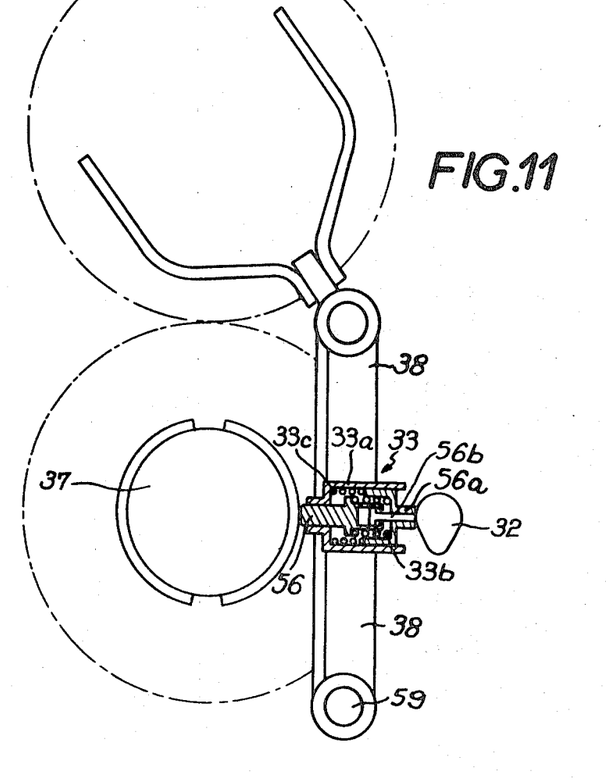
FIG. 11 is a partial section along the line I—I of FIG. 10.

The cam 37 acts in conjunction with a fork or other cam follower 38, to which translational motion is imparted by the cam 37 by means of two studs 56 and 57, which are engaged alternatively to effect the change-over, the fork 38 being guided in its movement by two fixed guides 58 and 59, rigidly attached to the frame 31; the fork 38 imparts translational motion to a slide 60, acting on dog-action teeth or other engagement members carried by the pinion 53 (FIGS. 1, 10 and 11).

The studs 56 and 57 are engaged alternatively with the cam 37 through the agency of a double cam 32, having two different bosses spaced angularly apart, one of these bosses being shown in FIG. 11; this double cam 32 has rotary motion about a shaft (not shown) fixed to the casing 31. The double cam 32 acts on the studs 56 and 57 by means of a mechanism 33, having a two-way spring action. This mechanism 33 consists of a casing 33a, within which can slide the stud 56 and an intermediate head 56a, on which is secured a restoring member 56b. A compression spring 33c, which bears against the base of the casing 33a, holds the head 56a in contact with part of the double cam 32; and a spring 33b, which bears against the head 56a, and drives the stud 56 to the left in FIG. 11. The restoring member 56b is shouldered so as to limit the leftward (as seen in FIG. 11) travel of the stud 56. The cam 37 (FIG. 12) has a relief profile incorporating two "arrows," 37a and 37b, each lying within the extension of the other and together covering the entire periphery of the cam 37; each of these arrows 37a and 37b contains a central opening, 37c.

Figure 2:
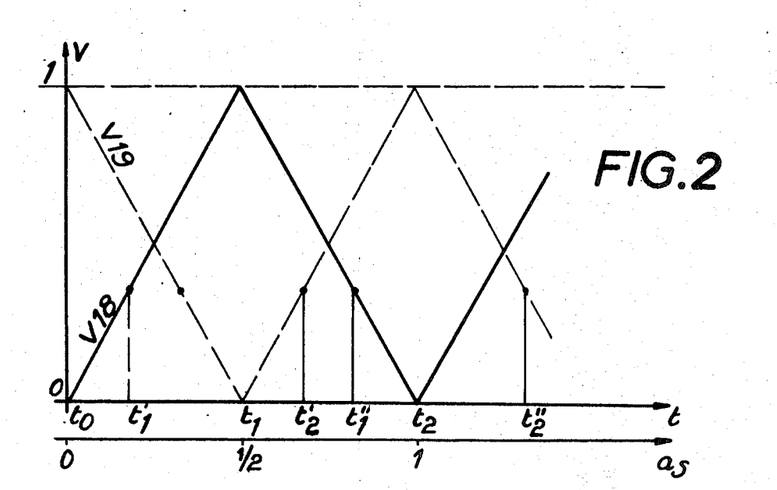
FIG. 2 is a diagram showing the oscillatory shaft speed plotted against time.

The effect of the mechanical assembly constituting the power group 1 is to impart to the two oscillatory shafts 18 and 19, from a driving shaft, the speed of which is taken to be unity, motions at variable speeds, the laws of variation of these speeds being periodic and phased 180° apart. The speed variations with time of these shafts are shown in FIG. 2.

At the moment $t_0$, the speed $V_{18}$ of the oscillatory shaft 18 is zero and the speed $V_{19}$ of the shaft 19 is equal to the unit speed of the shaft 5; the rotation of the shafts will be reckoned angularly from that instant.

By convention, the positive direction for the speeds on the shafts 5, 11, 18 and 19 will be regarded as those directions which would result from the direct engagement of pinions carried by those shafts.

At the moment $t_1$, which is such that the angle $a_5$ of rotation of the shaft 5 is equal to half a revolution, the speed $V_{18}$ of the oscillatory shaft 18 will have become equal to unity, the speed $V_{19}$ of the oscillatory shaft 19 will be zero and the angles of rotation $a_{18}$ and $a_{19}$ of each of the oscillatory shafts 18 and 19 will be equal to one quarter of a revolution, the laws of variation governing the speeds $V_{18}$ and $V_{19}$ being linear between the instants $t_0$ and $t_1$.

At the instant $t_2$, the shaft 5 will have carried out a further half-revolution and the speeds $V_{18}$ and $V_{19}$ of the oscillatory shafts 18 and 19 will have returned according to another linear law to their initial value, the time interval $t_0$–$t_1$ representing the general periodicity of this movement, which is repeated indefinitely.

The speeds $V_{18}$ and $V_{19}$ of the oscillatory shafts 18 and 19 are such that their sum is always equal to unity. The differential formed by the planet-wheel carrier 10 and the sets of pinions 14 and 15 in mesh with each other and with the pinions 12 and 13 of equal diameter introduces this relationship, so long as the reduction ratio between the pinions 6 and 9 is 1:2. Hence, if the speed law of one of the shafts 18 or 19, be established by suitable gearing to conform to the diagram in FIG. 2, that will in itself ensure that the law governing the other will conform to the same diagram. This mesh relationship is in fact brought about, for the shaft 18, during a time $t'_1$–$t''_1$ slightly overlapping the time during which the speed $V_{18}$ of the shaft 18 is equal to or greater than one-half. Similarly, the mesh relationship for the shaft 19 is brought about during the time $t'_2$–$t''_2$ slightly overlapping the time during which the speed $V_{19}$ of the shaft 19 is equal to or higher than one-half. In this way, the laws of motion of the shafts 18 and 19 are established in turn, the mesh relationships being brought about by the sets of oscillatory pinions 7 and 20, and 8 and 21, defined hereinafter.

On the one hand, the sum of the pitch-circle radii, $R_7$ in the case of the pinion 7 and $R_{20}$ in that of the pinion 20, is always equal to their distance $e$ between centers; and, on the other hand, the ratio between the pitch-circle radius $R_7$ of the pinion 7 and the pitch-circle radius $R_{20}$ of the pinion 20 is equal to the speed of rotation of the shaft 18. In the diagram in FIG. 2 can be found the law $V_{18}=f(a_5)$ and from this can be deduced, by integration, the law $a_{18}=g(a_5)$. Thus, for every angular position of the pinion 7, we have, defined by the angle $a_5$, the corresponding angular position $a_{18}$ of the pinion 20, and on each of these two pinions the corresponding point of each can be defined on their pitch-circle profile by the values $a_5$ and $a_{18}$ of their polar variable and their radius $R_7$ and $R_{20}$, from the formulae:

$$R_7 = \frac{eV_{18}}{1+V_{18}}$$

$$R_{20} = \frac{e}{1+V_{18}}$$

$$a_{18} = \int_0^{a_5} V_{18}d(a_5)$$

The application of this rule of construction to the diagram in FIG. 2 produces, for the pinions 7, 8, 20 and 21, the pitch-line profiles shown in FIGS. 3a, 3b, 3c and 3d, which in that order represent four particular positions spaced regularly round one complete revolution of the input or primary shaft 5.

In one particularly advantageous embodiment, a strictly circular profile is chosen for pinions 7 and 8, which for the pinions 20 and 21 gives profiles sufficiently close to the circular to allow of profiles which are in fact circular, the law of motion obtained being substantially sinusoidal.

Figures 3A, 3B:
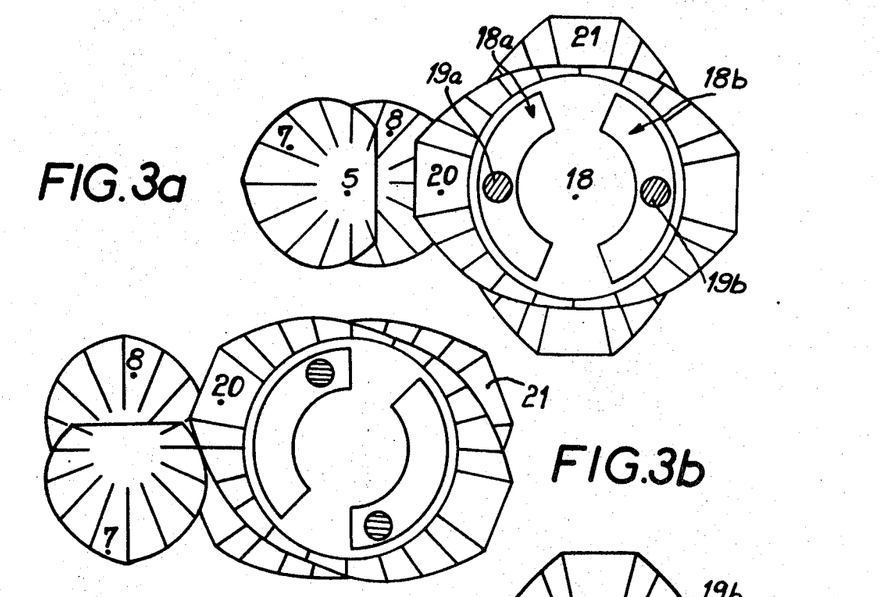
FIGS. 3a to 3d show four positions of oscillatory pinions, regularly spaced round one complete turn of the input shaft of the transmission.
Figure 3C:
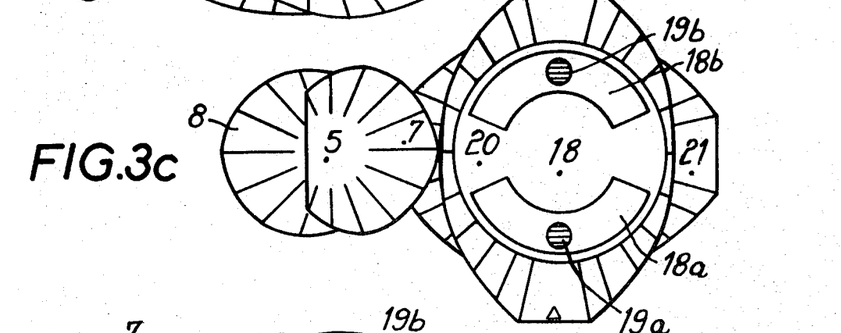

FIG. 3c, which relates to the moment of time $t_1$, shows the respective positions of the pinions 7 and 8, keyed 180° apart to the shaft 5, and of the pinions 20 and 21, keyed to the shafts 18 and 19 respectively, the latter being represented, at the pinion 20, by arms 19a and 19b passing through openings 18a and 18b in the pinion 20; as the radii of the pinions 7 and 20 are equal at this particular meshing point, the reduction ratio is 1:1, which agrees with the diagram in FIG. 2. The position of the pinions 8 and 21 is similar to that of the pinions 7 and 20 taken from FIG. 3a. In these drawings, it can be seen that the pinions 20 and 21 carry out 45° movements in relation to each other, starting from the respective settings in FIG. 3c. This property makes it possible for the pinions 20 and 21 to be keyed to the coaxial shafts 18 and 19, though the latter has its two arms 19a and 19b passing through the pinion 20.

Figure 3D:
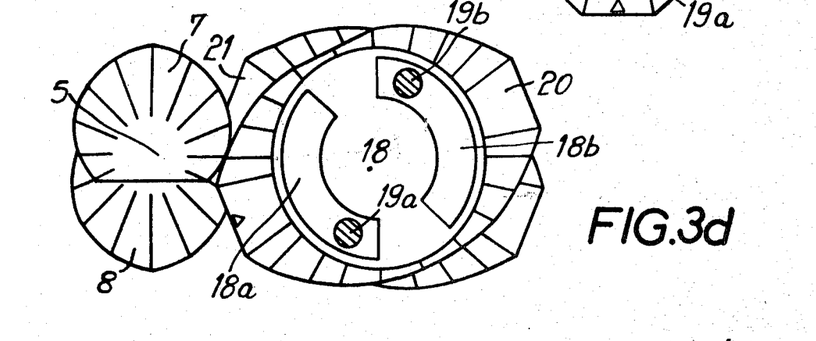
Figure 4A:
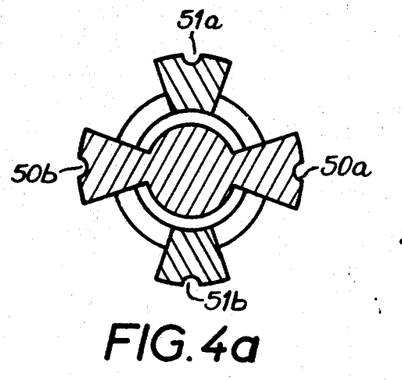
FIGS. 4a to 4d are sectional views of dog-action engage mechanism.
Figure 4B:
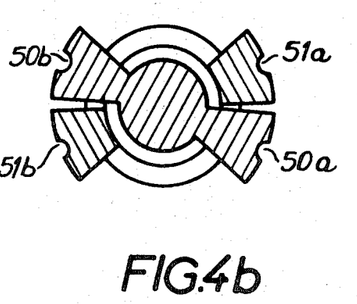
Figure 4C:
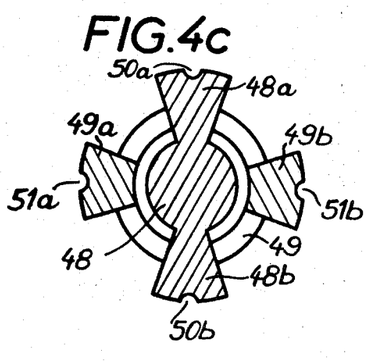
Figure 4D:
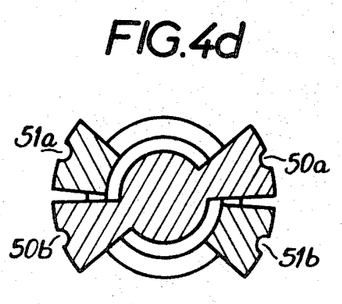

The pinions 7, 8, 20 and 21 may, of course, be made toothless over those portions which do not work together, the pitch circle being truncated, more over, as can be seen from FIG. 3.

Non-linear laws can be adopted, the rules of construction remaining identical to those just described, but the range of relative angular movement of the two pinions 20 and 21 will generally be affected accordingly.

In FIG. 3c, the pinion 20 has unit speed and the pinion 21 zero speed, whereas the speed $V_{21}$ of the pinion is unity in FIG. 3a and the speed $V_{20}$ of the pinion 20 is zero.

It will be seen, therefore, that there is an immediate connection between the directional position of a pinion and its speed at any given moment.

FIGS. 4a to 4d show sectional views of the dog-action engagement teeth or other members of the oscillatory shaft 48, which contain grooves 50a and 50b, and the dog-action engagement teeth or other members of the shaft 49, containing grooves 51a and 51b.

In the section plane, the shaft 48 has two extensions 48a and 48b, in the form of sectors of a circle, and the oscillatory shaft 49 is reduced to two similar sectors, 49a and 49b. These sectors are so dimensioned as to allow the two shafts 48 and 49 to oscillate by about 45° in relation to each other, without these sectors coming into contact. The various grooves, 50a, 50b, 51a, and 51b act in conjunction with pins carried by the pinion 53. On each side of the engagement or abutment members 50 and 51 (FIG. 10) are other engagement or abutment members, fixed 52 and movable 40, which act in conjunction with other pins carried by the pinion 53.

Figure 5A:
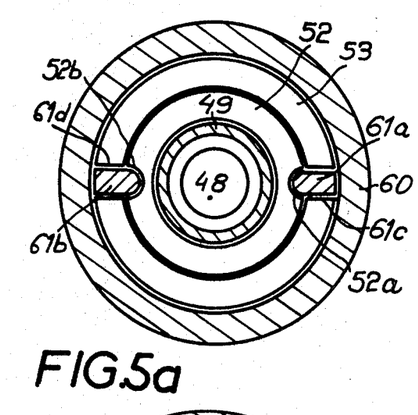
FIGS. 5a to 5d are sections along the line I—I of FIG. 1 at the instants $t_1$, $t_2$, $t_3$, and $t_4$.

Let the secondary shaft 55 be assumed to be stationary, it being desired to accelerate this from zero to unity between the times $t_2$ and $t_3$. In accordance with the diagram of FIG. 8, the various angular positions of the members at the moments $t_1$, $t_2$, $t_3$, and $t_4$ are shown in FIGS. 5a, 6a and 7a; 5b, 6b and 7b; 5c, 6c, and 7c; and 5d, 6d, and 7d.

FIG. 5 shows a ring on the pinion 53, a stop engagement member 52, provided with grooves 52a and 52b and locked to the pinion 53 by the pins 61a and 61b, which can slide within passages 61c and 61d, provided for the purpose on the ring of the pinion 53, and can be kept in the engaged position by a boss on the slide 60.

Figure 6A:
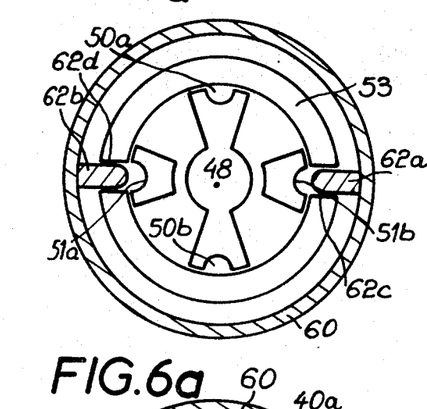
FIGS. 6a to 6d are sections along the line II—II of FIG. 1 at the instants $t_1$, $t_2$, $t_3$, and $t_4$.

FIG. 6a shows the grooves 50a and 50b connected with the shaft 48 and the grooves 51a and 51b connected with the shaft 49 (not shown); the pinion 53 carries in this plane pins 62a and 62b which can slide within passages 62c and 62d, in the pinion 53, the pins 62a and 62b being in the retracted position because of a recess in the slide 60.

Figure 7A:
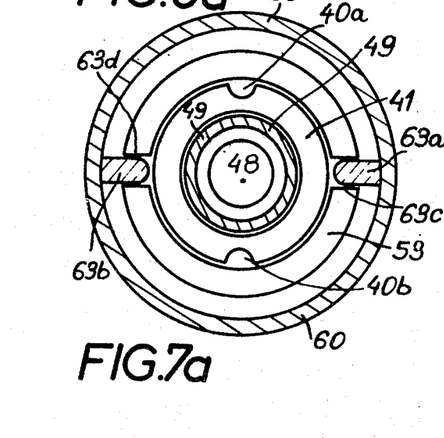
FIGS. 7a to 7d are sections along the line III—III of FIG. 1 at the instants $t_1$, $t_2$, $t_3$, and $t_4$.
Figure 8:
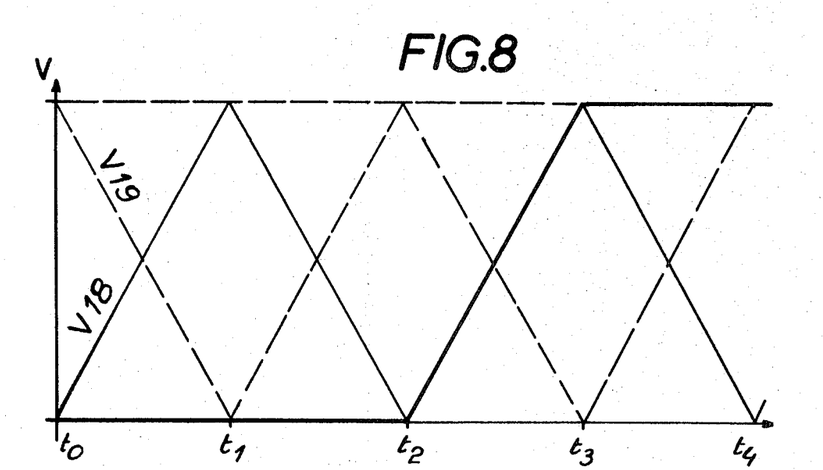
FIG. 8 is a diagram showing the secondary-shaft speed variation plotted against time.

FIG. 7a shows the power shaft 41, provided with grooves 40a and 40b, and the pinion 53 carrying pins 63a and 63b, which can slide within passages 63c and 63d which pins can be retracted because of a recess in the slide 60.

Figure 5B:
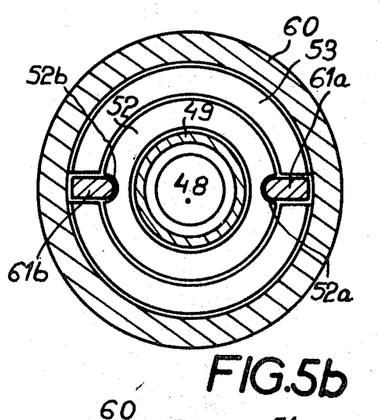
Figure 6B:
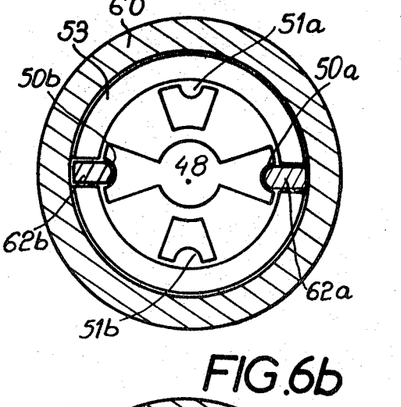
Figure 7B:
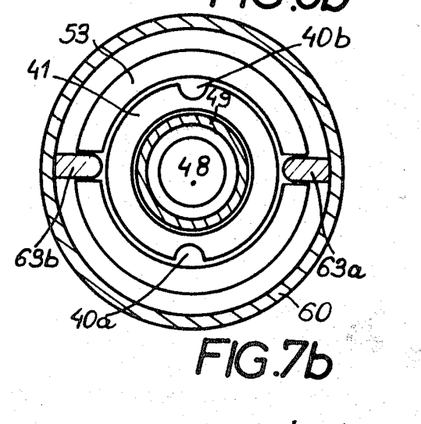

In FIGS. 5b, 6b and 7b, which show the same sections at instant $t_2$, the pins 61a and 61b can be seen to be still fully engaged, the pins 62a and 62b fully engaged and the pins 63a and 63b retracted because of movement of the slide 60.

Figure 5C:
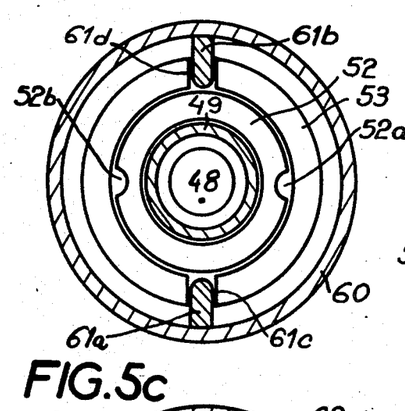
Figure 6C:
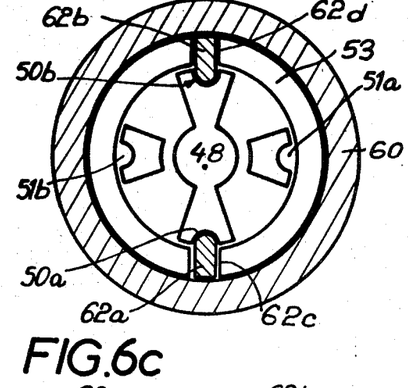
Figure 7C:
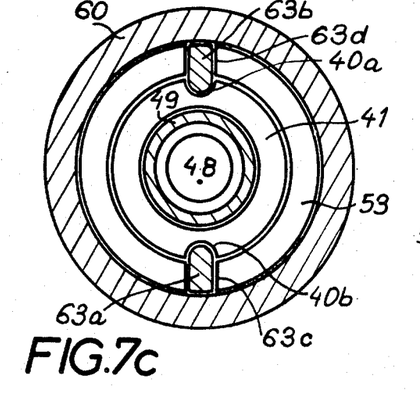

In FIGS. 5c, 6c and 7c, the pins 61a and 61b are retracted and the pins 62a, 62b, 63a and 63b are engaged.

Figure 5D:
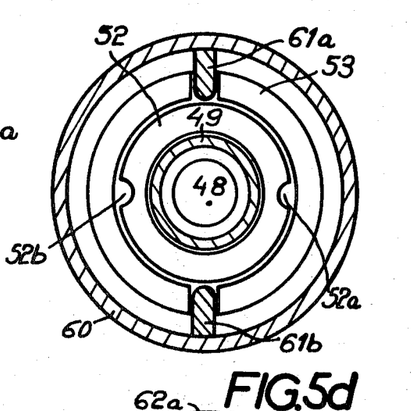
Figure 6D:
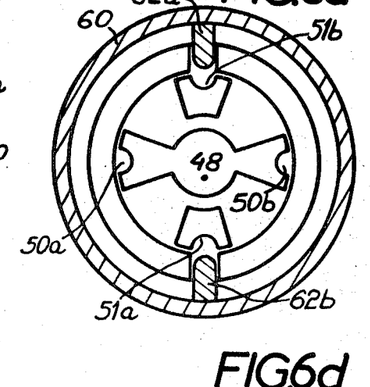
Figure 7D:
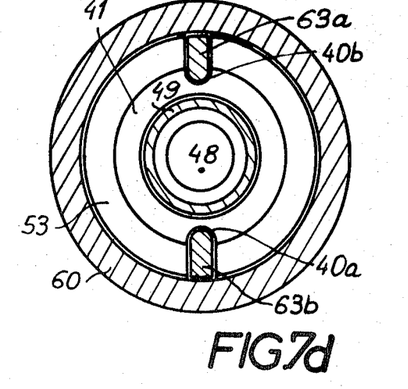

In FIGS. 5d, 6d and 7d, the pins 61a, 61b, 62a and 62b are retracted and the pins 63a and 63b are engaged.

Thus, until the instant $t_1$, the pinion 63 was held by the stop engagement member 52. Between instants $t_1$ and $t_2$, the pinion 53 began to be engaged with the shaft 48 and precisely at moment $t_2$ is engaged by the two assemblies 50 and 52, this being made possible by the coincidence in speed and position of the stop engagement member 52 and the shaft 48. From that instant, the engagement of the pinion 53 is freed from the stop engagement member 52, the engagement of the pinion 53 with the shaft 48 being maintained. Just before the instant $t_3$, the engagement member of the pinion 53 begins to be engaged with the power shaft 41 and starting from the moment $t_3$ the engagement of the pinion 53 with the shaft 48 is released.

This is achieved by translational movement of the slide 60 through the agency of the fork 38 under the action of the cam 37, in the following manner:

At some instant between $t_1$ and $t_2$ and preferably about half-way through that period, the stud 57 is disengaged and the stud 56 is engaged by swinging over the double cam 52. The stud 56 thereupon engages in the cut-away central portion 37c of the "arrow" 37a (FIG. 12), shortly before the instant $t_2$, the stud 56 comes into contact with the left-hand profile of the arrow 37b and the movement of the cam 37 results in an initial translational movement of the fork 38. During the first part of this translational movement, the slide 60 is shifted to a position in which it fully engages the pins 62a and 62b, while keeping the pins 61a and 61b engaged.

Figure 12:
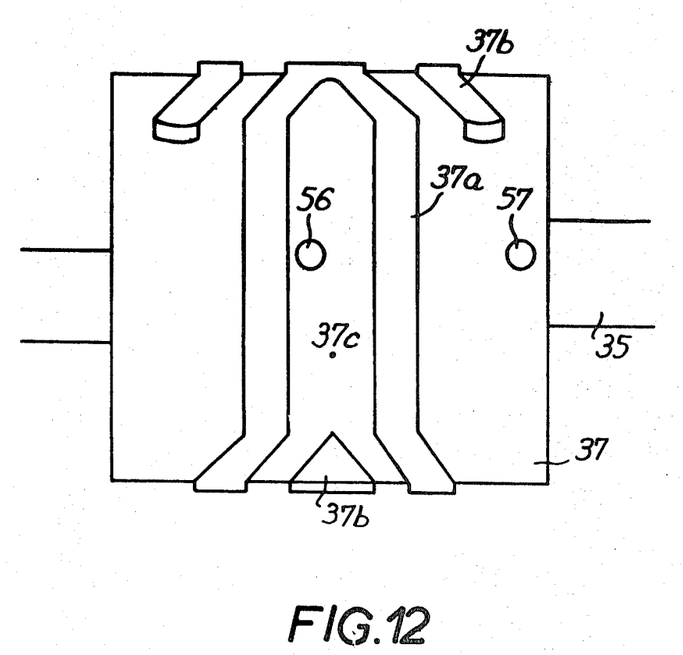
FIG. 12 is a plan of a cam forming part of the transmission.

During the second part of this translational movement, directly following the instant $t_2$, the slide 60 continues to travel, keeping the pins 62a and 62b engaged and allowing the pins 61a and 61b to disengage. Then the fork 38 and the slide 60 come to a stop in this intermediate position on the left-hand part of the arrow 37b. At the exit from the arrow 37b, a second translational movement of the fork 38 and slide 60 takes place substantially at the instant $t_3$. During the first part of this second translational movement, the movement of the slide 60 brings about the engagement of the pins 63a and 63b, while the pins 62a and 62b are held in engagement, and by the end of this translation, the pins 63a and 63b alone being engaged, the slide is in the position shown in FIG. 10. Subsequent engagement of the stud 57, accompanied by the release of the stud 56, will bring about an inverse action, the stud 57 engaging in the cut-away central portion of one of the two arrows and then coming to bear against the right-hand profile of the arrow 37a or 37b, according to the time interval in which the action starts (FIG. 12).

Two coupling boxes such as 2 and 3 (FIG. 1) thus have secondary shafts, 55 and 65, which can be accelerated or stopped independently.

Obviously, these two secondary shafts can either be used separately for driving mechanisms with two inputs or combined with the aid of a combining mechanism such as 4, consisting essentially of conventional planetary or differential gears, to provide the single tertiary or output shaft 66, able to accommodate four different speeds, such as, for example, one standstill position, two speeds in one direction and one in the other.

Another combination consists in connecting the primary or input shaft and secondary shafts to the same combining mechanism, from which a single tertiary shaft emerges.

By associating $n$ secondary shafts with the aid of $n-1$ combining mechanisms in series, one thus obtains $2^n$ possible speeds; and such a grouping of $n-1$ combining mechanisms is accordingly known as an $n$-input combining mechanism.

In this way, as many tertiary shafts can be obtained as desired, to each of which a certain number of speeds can be imparted.

It is possible, of course, subject to irreversibility, to regard one of these tertiary shafts as the input for the mechanism just described and likewise to associate a number of such mechanisms, the input shaft of one being the output shaft of another.

Elementary positive-drive transmissions based on the invention can be coupled together to form a more complex assembly and, in certain cases, it is necessary to provide in each such elementary transmission only one coupling group or possibly several coupling groups.

What has been illustrated and described is one particular positive-drive transmission, resulting primarily from the employment of two oscillatory shafts arranged coaxially.

Figure 13:
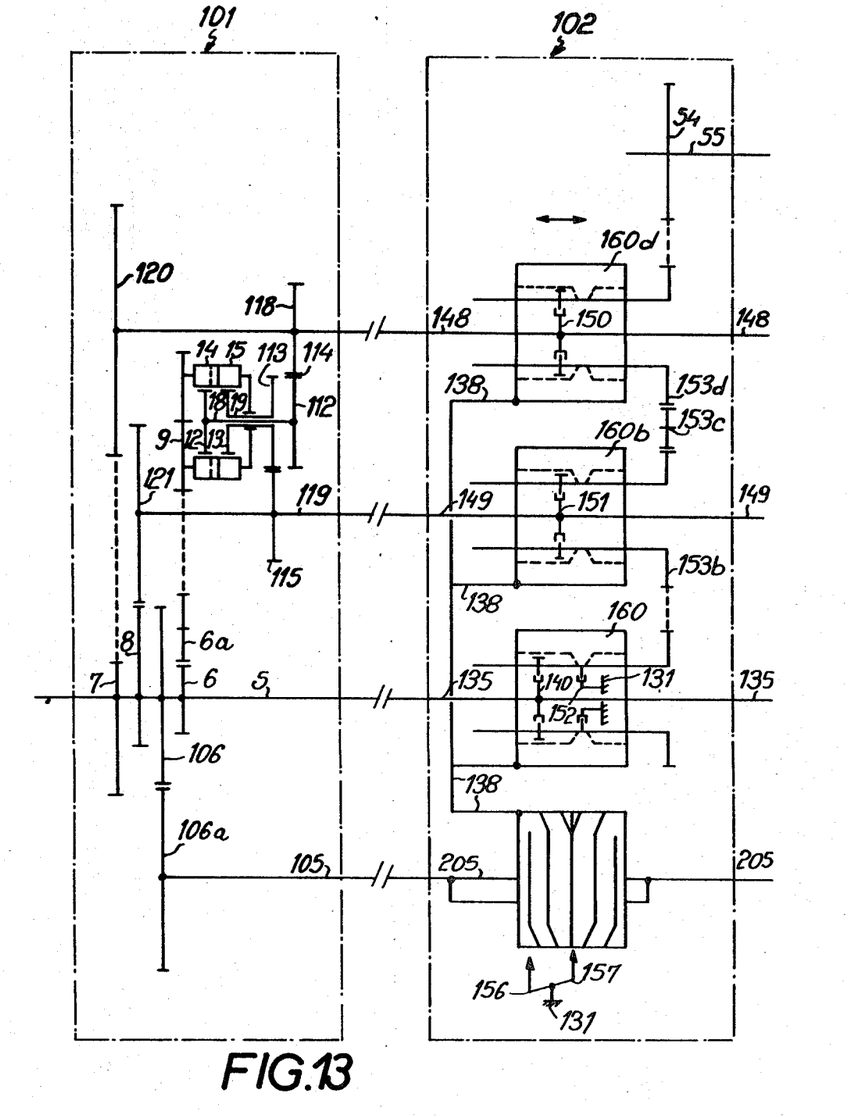
FIG. 13 is a diagram of a modified embodiment of a positive-drive transmission constituting a modification.

In a modification, shown in FIG. 13, the positive-drive transmission in accordance with the invention comprises a power group 101, and coupling groups, only one of which 102, is illustrated.

In the power group 101, parts similar to those described in relation to the power group 1 shown in FIG. 1, are indicated by the same reference numerals. A relay pinion, 6a, has been inserted, however, between the pinions 6 and 9, merely so as to respect the directions of rotation. Keyed to the two coaxial oscillatory shafts 18 and 19 are two pinions 112 and 113, which mesh with two pinions 114 and 115, keyed to non-coaxial oscillatory shafts 118 and 119 constituting the outputs of the power group 101. To these shafts 118 and 119 are keyed oscillatory pinions 120 and 121 respectively, identical to the pinions 20 and 21 in FIG. 1 and operating in conjunction with the oscillatory pinions 7 and 8 keyed to the shaft 5. In addition, a pinion 106, keyed to the primary shaft 5, is in mesh with a pinion of the same diameter 106a, keyed to the shaft 105, which likewise constitutes an output shaft of the power group 101.

The coupling group 102 comprises a shaft 135, coupled by a homo-kinetic transmission mechanism (not shown) to the input shaft 5. Mounted on this shaft 135 are dog-action engagement members 140, and further such members 152, fixed to the casing 131, are mounted concentrically about this same shaft.

The oscillatory shafts 148 and 149, coupled homokinetically to the oscillatory shafts 118 and 119, are provided with abutment members 150 and 151 respectively. The abutment members 150 and 151 can be acted upon by conventional engagement means carried by a pinion 153, which rotates on a shaft coaxial with the shaft 135. This pinion 153 forms part of a train of pinions in mesh with one another, the said train consisting of the pinions 153b, 153c, 153d and 54, of which the last is keyed to the secondary shaft 55 of the coupling group 102. The pinions 153b and 153d are provided with means of engagement operating respectively in conjunction with the engagement members 151 of the oscillatory shaft 149 and with the abutment members 150 of the oscillatory shaft 148. A shaft 205, coupled homo-kinetically to the shaft 105, carries a cam 137, to which rotary motion is imparted by the shaft 205 and which has freedom to slide on that shaft. The translational movement of this cam are taken up by a multiple fork 138, the translational movement of which is guided by means not shown in the drawing and which, in one and the same movement, moves the slides 160, 160b and 160d. This cam acts in conjunction with two studs, 156 and 157, either of which can be withdrawn into recesses provided for the purpose in the casing 131.

The entire movement described with reference to FIGS. 1 to 12 as a whole is reproduced in this case and the relative angular positions of the various parts are the same, as is also their mode of operation; but in this case it is the cam which moves and the studs which are stationary.

The profile of the cam 137 is substantially the same as that of the cam 37 and the studs 156 and 157 are controlled by means similar to those controlling the studs 56 and 57.

It should be noted that in both the previous embodiments, the speed change was carried out over a half-revolution of the input of primary shaft 5.

That being only one specific example, which was described first solely in order to provide a clearer understanding of the invention, a brief description will now be given of the transmission as it is when the speed change is effected over $n$ half revolutions of the input shaft 5.

Figure 14:
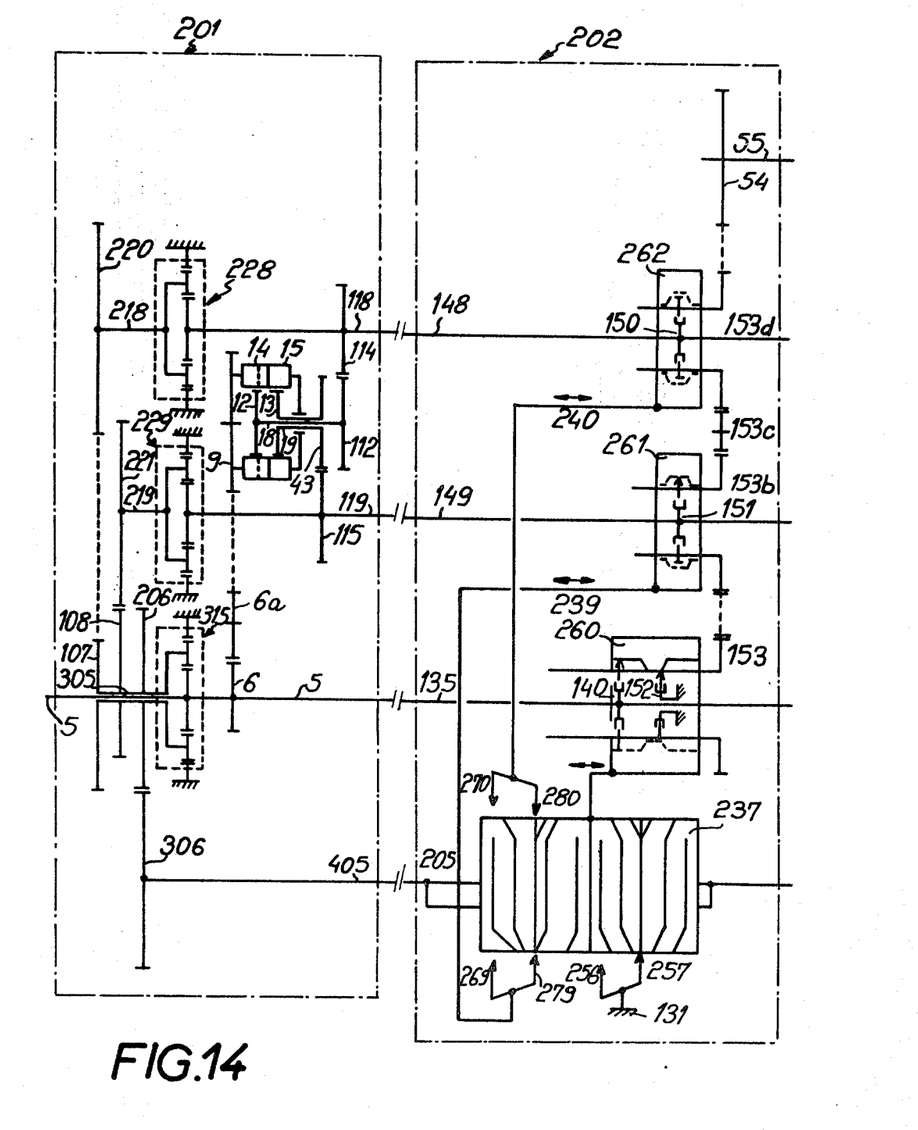
FIG. 14 is a diagram of a further embodiment of a positive-drive transmission, in which the transfer is made over $n$ revolutions of the input shaft.

In FIG. 14, the power group 201 comprises parts similar to those in the power group 101 in FIG. 13 and these have accordingly been given the same reference numerals. The shaft 118 drives an oscillatory shaft 218 through reduction gearing, 228, the reduction ratio of which is $n$; similarly, the oscillatory shaft 119 and the input shaft 5 drive an oscillatory shaft 219 and a shaft 305 through reduction gears, 229 and 315 respectively, having the same reduction ratio $n$. The shaft 305 drives the shaft 405 through pinions, 206 and 306, equal in diameter. The shaft 305 carries two oscillatory pinions, 107 and 108, which are similar to the pinions 7 and 8. The oscillatory shafts 218 and 219 likewise carry oscillatory pinions, 220 and 221, similar to the pinions 120 and 121 respectively, the operation of this group of pinions being identical to that described with reference to FIG. 1.

By this means, oscillatory shafts, 118 and 119, having a mean speed of rotation identical to that obtained in the embodiment of FIG. 1, but the speed-change period of which is increased in the ratio $n:1$. In the same way, the number of revolutions made by the oscillatory shafts 118 and 119 during one cycle is equal to $n/2$ revolutions instead of one half revolution, and the relative angular differences between the shafts 118 and 119 amount to as much as $n$ times 45°.

The coupling group 202 associated with this power group 201 comprises parts similar to those in the group 102 which are similarly numbered.

Figure 15:
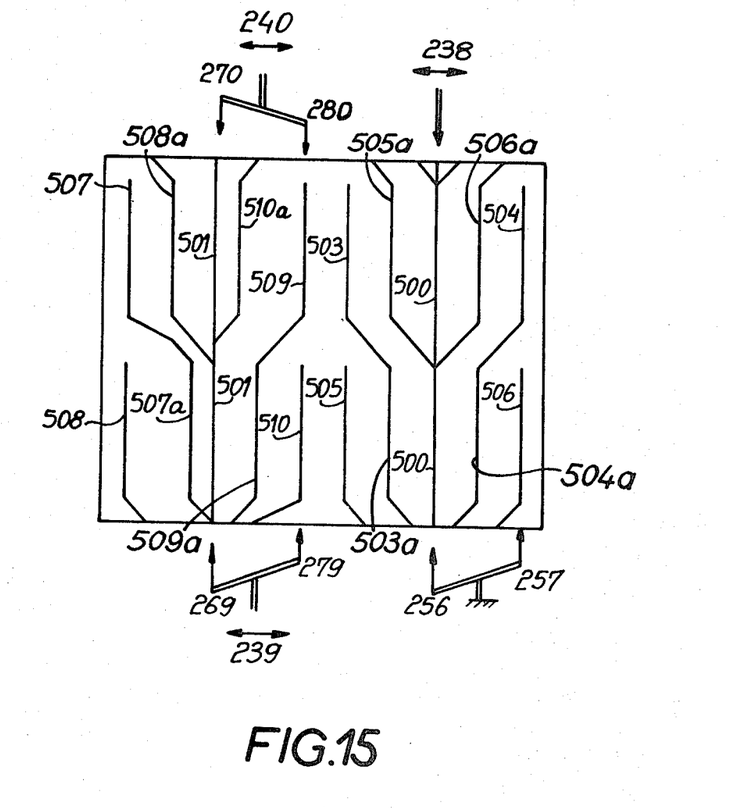
FIG. 15 is a development of a cam forming part of the embodiment of FIG. 14.

The cam 237, shown in developed form in FIG. 15, can slide on the shaft 205 but rotates with it, this shaft 205 being connected homo-kinetically to the shaft 405. This cam 237 acts in conjunction with two studs, 256 and 257, which can be withdrawn into two recesses in the casing 131. In FIG. 15, too, the stud 256 can engage in grooves 503 or 505 and then 500 machined on this cam, and the stud 257 can engage in the grooves 504 or 506 and then 500. A fork 238, transmits the translational movements of the cam 237 to the slide 260. A fork 239, equipped with two studs 269 and 279, either of which can be withdrawn, drives a slide 261. A fork 240, is equipped with two studs 270 and 280, either of which can be withdrawn, drives a slide 262, the studs 270 and 280 being disposed opposite to the studs 269 and 279 in relation to the shaft 205.

The stud 269 can engage in grooves 507 or 508 and then 501, while the stud 279 can engage in grooves 509 or 510 and then 501.

The stud 270 can engage in grooves 507 or 508 and then 501, and the stud 280 can engage in grooves 509 or 510 and then 501.

The studs 256, 269 and 270 are engaged simultaneously by a device that is not shown but is equivalent to that shown in FIG. 11, while the studs 257, 279 and 280 are likewise engaged simultaneously by the same device (not shown), either of the two groups of studs being engaged according to the desired direction of operation. The group of studs 256, 269 and 270 is intended to set the secondary shaft 55 in motion, while the group of studs 257, 279 and 280 is intended to stop it.

The motion of the slides 260, 261 and 262 will be readily understood by reference to FIG. 15, which provides a developed view of the periphery of the cam 237. Let it be assumed that the stud 256 is engaged in the groove 500 and that the studs 269 and 270 are engaged in the groove 501. At a given moment, the studs 257, 279 and 280 are engaged and the previous studs disengaged; the result of this action is to engage the stud 257 in the groove 504, the stud 279 in the groove 509 and the stud 280 in the groove 510. As the cam 237 rotates, the stud 257 will follow the groove 504 and then the groove 504a, thus forcing the cam 237 to carry out a sideways move to the right, of amplitude A. In the same time, the stud 279 will follow the groove 509 and then the groove 509a; since the grooves 509 and 509a are homologous to within one translation (and possibly to within one rotation) with the grooves 504 and 504a, the stud 279 is therefore able to remain motionless during this movement of the cam 237.

As for the stud 280, it passes from the groove 510 to the groove 510a, the shape of which differs from the foregoing, giving rise to a displacement of amplitude $A/2$ to the left in FIG. 15 and, consequently, displacement of the slide 262 through the action of the fork 240. Subsequently, the stud 257 will pass from the groove 504a to the groove 500 and the cam 237 will carry out a second translational movement, of amplitude A, to the right. During this second translation, the stud 279 will pass from the groove 509a to the groove 501, the fork 239 remaining motionless. The stud 280 will pass from the groove 510a to the groove 501, causing the fork 240 to move back again and the slide 262 to be restored.

During these movements, the engagement 140 connecting the pinion 54 to the shaft 135 will have been released, the engagement of the pinion 54 to the oscillatory shaft 148 temporarily engaged and the engagement of the pinion 54 to the stop engagement member 152 operated permanently.

It is easy to see that the movements of the various slides will thus be effected either to the right or to the left in the course of each change operation; the selection of a slide 261 or 262 will result from the shape of the grooves.

It is obvious, from the diagram in FIG. 15, that a change operation can be interrupted during the intermediate stop phase by reversing the positions of the groups of studs; a speeding-up is thus obtained immediately followed by a slowing-down, or vice versa.

All the examples just described show in detail how the change-over takes place between a high speed shaft and an imaginary shaft having zero speed. However, it goes without saying that the same principles can be applied to changes in which two power shafts have speeds of X and Y, a pair of oscillatory shafts carrying out their evolutions continuously between these two speeds, with the sum of the oscillatory shaft speeds always equal to the sum of the power shaft speeds; the values of X, Y and $n$ being chosen in such a way that there is angular coincidence between the oscillatory shafts and the power shafts X and Y when their speeds coincide.

Where there is nothing to be gained by obtaining precisely defined stop positions, all the means of engagement previously used may be replaced by conventional couplings designed to transmit the torque but not called upon to slide or slip so as to equalise the speeds of the shafts connected by them, this equalisation having been obtained by the present invention.

To conclude all that has gone before, an example will now be given of the application of such a positive-drive transmission, as illustrated in FIG. 1. This is to be used for the numerical control of a machine tool such as a lathe, for example, the kinematics of which are represented diagrammatically in FIG. 16.

Before describing such an application, it should be explained that such numerical control involves a programmer and one or more supplementary blocks and that decadal blocks have been created by the association of four coupling groups and a combining mechanism arranged so as to supply a tertiary shaft of which the speed is a linear combination of the speeds of the four secondary shafts, to which speeds the combining mechanism applies weighting coefficients of 1/20, 2/20, 2/20 and 5/20 respectively.

As a result, speed quantification is obtained for the output of each of the decadal blocks, all identical to one another; each of these shafts, in fact, is capable of assuming eleven different conditions of speed distributed linearly between 0 and 1/2; another result is that the output motion of the decadal block is quantified in position, the quantum of motion being equal to 1/40 of a revolution.

In particular, the possible stop positions of the decadal block are distributed at every 9° over one revolution.

A programmer is the means whereby an impulse of electricity, for example, can be sent by one route for starting an input shaft required to change-over and by another route for stopping it; the actual change-over is effected over half a revolution of the power shaft, namely the first half-revolution following receipt of the command. One can therefore determine the quantum of programming and execution; this corresponds to one half-revolution of the power shaft, or "step." The programmer may be a simple perforated-tape reader driven directly by the power shaft, but that is not the only possible solution.

Supplementary blocks are blocks responsible for adaptation between the decadal blocks and the machine to be equipped and their design depends on the requirement to be fulfilled, their main functions being: secondary change-over, for coupling an output shaft from the coupling group with which it is associated to a number of independent users; as a locking inverter, taking advantage of the stopping property of decadal blocks to obtain both directions of rotation and precise locking upon stopping when the output shaft of the block rotates in only one direction; and as a combiner of the motions of two decadal blocks with coefficients of one and one-tenth, for example.

Figure 16:
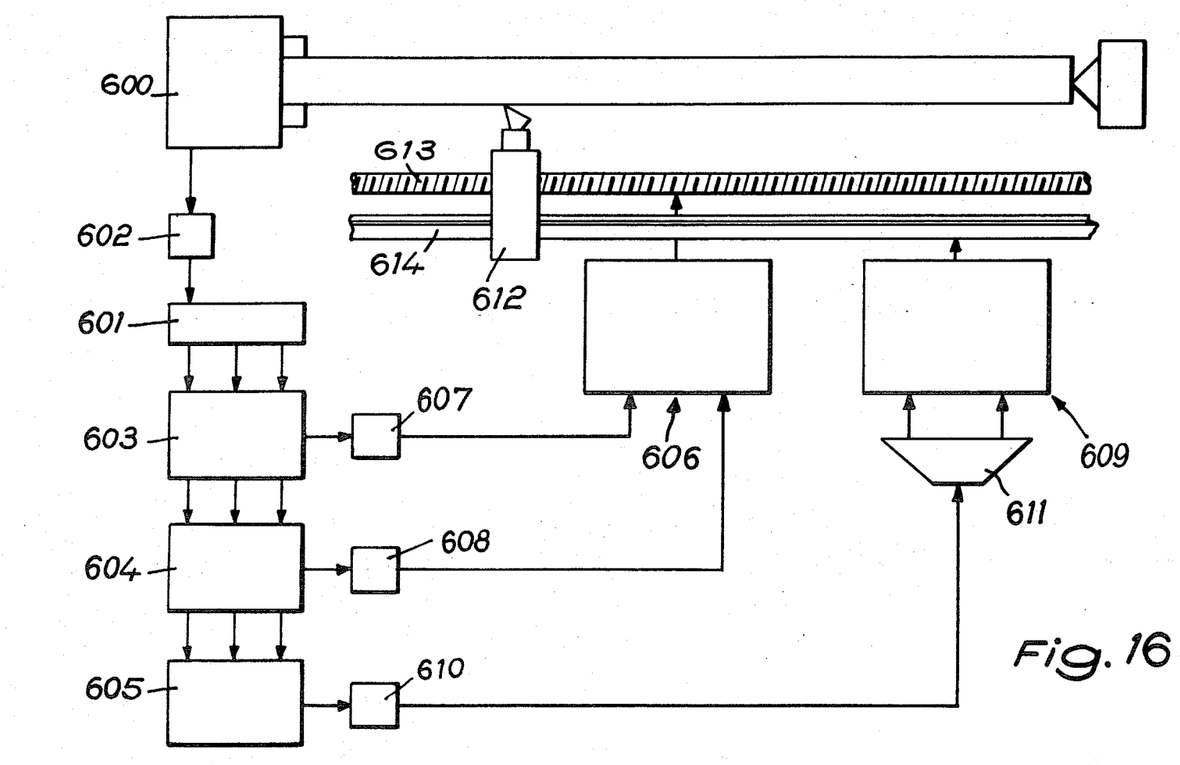
FIG. 16 is a diagram illustrating the kinematics of a machine tool.

A take-off on the lathe spindle 600 drives a power group 601, through reduction gearing 602. The power group 601 in turn drives three decadal blocks 603 to 605. Each of the decadal blocks 603 and 604 acts on a supplementary traversing block 606, through a locking inverter 607 and 608 respectively; the third decadal block 605, acts on a supplementary cross-slide block 609, through a locking inverter 610, and a change-over 611. As explained above, the locking inverters and change-overs are integrated in the supplementary blocks, having been shown separately only to make the explanation clear. The block 606 imparts motion to a saddle 612, by some appropriate means such as, for example, a lead-screw 613, having a pitch of ten. The block 609 imparts transverse motion to the tool by some suitable means such as, for example, a feed bar 614, which provides the cross feed.

One particularly important advantage of this arrangement is the strict synchronisation between the various movements imparted to the machine tool. In this particular case, the path followed by the lathe tool depends on the commands given by the programme and is completely independent of the speed of rotation of the power group input shaft. It is thus possible to use a lathe for machining cones and any other shapes, even when the power group is driven by a motor independent of the lathe motor. By driving the power group 601 from the lathe spindle 600 through the reduction gear 602, it is possible to machine shapes other than solids of revolution, such as, for example, screw threads or certain cams.

One advantage of the hereinbefore described embodiments of the present invention lies in the fact that that the play that is liable to appear in the operation of couplings is no longer of such high imporance as hitherto proposed transmissions, since the stages are acted upon directly by the power group.

A further advantage of the embodiments described is the possibility of the association in parallel of different stages supplied by the same oscillatory sources, thus creating a modular system.

Finally, since each coupling group has a secondary shaft, it will be readily understod that these secondary shafts can be used either singly or in combination.

We claim:
1. A variable-ratio positive-drive transmission comprising an input drive unit including a first rotary driving shaft driving in a ratio 1/2 a differential system whose outputs constitute the driven shafts of the input drive unit, each of the driven shafts bearing a partially geared pinion which periodically meshes with a partially geared pinion mounted eccentrically on the driving shaft, the geared sectors of the said partially geared pinions borne by the driving shaft and the geared sectors of the pinions on the driven shafts being determined so that there is an angular position of the driving shaft for which the drive ratio between the geared sectors which mesh with one another is equal to 1, and so that for the two positions of the driving shaft disposed at 90° from the preceding position, the drive ratio of the geared sectors which mesh is equal to 1/2.

2. A variable-ratio positive-drive transmission as defined in claim 1, wherein the driven shafts of the input drive unit are disposed coaxially inside one another, the outer driven shaft passing through the partially geared pinion on the other shaft by means of arms capable of moving in arc-shaped openings made in said pinion on the other shaft.

3. A variable-ratio positive-drive transmission as defined in claim 1, including a driven output unit including a further driving shaft connected to said first driving shaft and two other driving shafts connected to the driven shafts of the input drive units; a pinion mounted on each of these latter three shafts of the output driven unit being connected to locking means, and a driven shaft connected on the one hand to said locking means and, on the other hand to a locking means fixed to a fixed point of the transmission, said locking means being controlled by a cam system driven by said first driving shaft of the input drive unit.

References Cited
UNITED STATES PATENTS

| | | | |
|---|---|---|---|
| 2,861,635 | 11/1958 | Orr | 74—393X |
| 2,877,755 | 3/1959 | Danilewicz | 74—393X |
| 3,255,644 | 6/1966 | Warren et al. | 74—745 |
| 3,473,414 | 10/1969 | Schachter | 74—437X |

ARTHUR T. McKEON, Primary Examiner

U.S. Cl. X.R.

74—437, 745